March 25, 1969   J. J. VAGI   3,435,183
METHOD AND APPARATUS FOR WELDING AN ALUMINUM
FIN TO A FERROUS METAL
Filed May 19, 1965
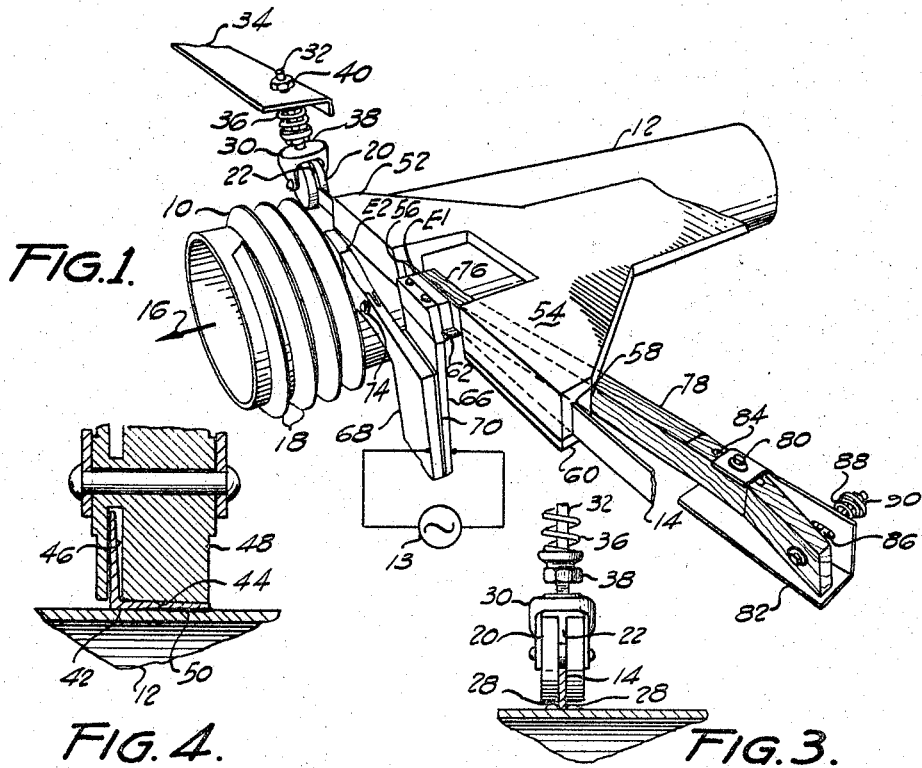
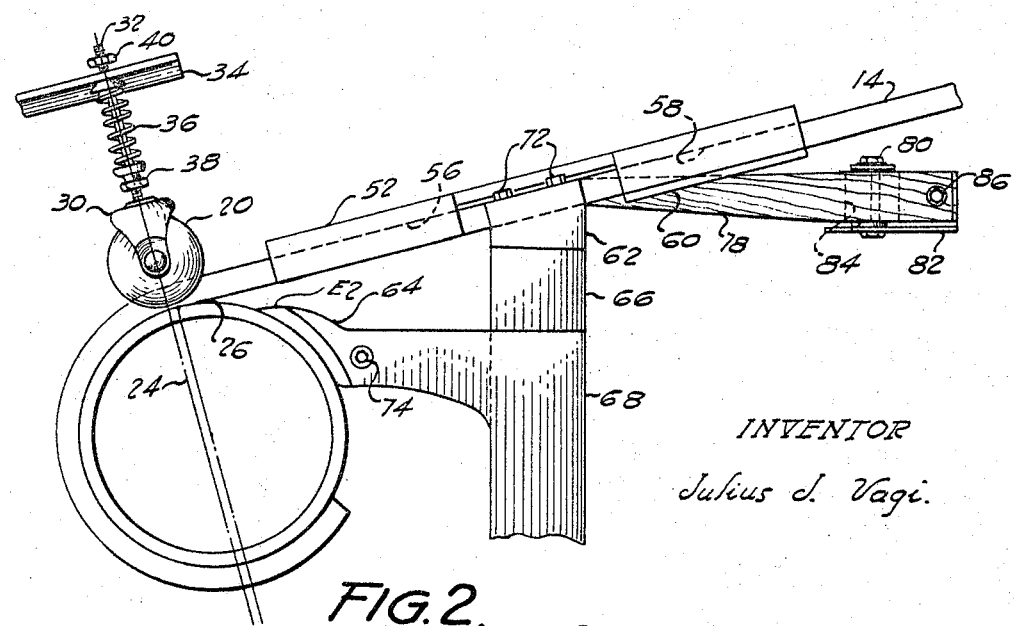
INVENTOR
Julius J. Vagi.
By Norton Lesser
Attorney

United States Patent Office 3,435,183
Patented Mar. 25, 1969

3,435,183
METHOD AND APPARATUS FOR WELDING AN ALUMINUM FIN TO A FERROUS METAL
Julius J. Vagi, Columbus, Ohio, assignor, by mesne assignments, to Stewart-Warner Corporation, Chicago, Ill., a corporation of Virginia
Filed May 19, 1965, Ser. No. 456,954
Int. Cl. B23k 11/20, 11/04
U.S. Cl. 219—107                                    5 Claims

ABSTRACT OF THE DISCLOSURE

The following specification describes a method and apparatus for welding an L-shaped aluminum fin to a stainless steel tube by controlling the length of the current path in the steel relative to the aluminum and by maintaining high welding speeds relative the current passed between the strip and the tube.

---

This invention relates in general to welding an aluminum fin to either steel or stainless steel and more particularly to a method and apparatus for rapidly and continuously welding a thin aluminum fin in a helix on a steel or stainless steel tube.

Helically wound finned tubing for a heat exchanger is generally produced by simply winding a fin on a tube, and fixing the ends of the fin to prevent its subsequent displacement. To provide efficient heat transfer or a thermal joint between the fin and tube, intimate contact is necessary throughout their length. In some cases, the fin is, therefore, mechanically fixed to the tube by crimping the fin in a helical groove in the tube to improve the thermal joint. Crimping the fin is attended by a number of difficulties and the thermal joint is still relatively inefficient, since the contact between the tube and fin is not the most intimate.

Soldering or welding the fin to the tube throughout the fin length provides the most efficient thermal joint. If feasible, aluminum, which has excellent thermal conductivity, is also preferred for use as a fin, with a ferrous tube, which is usually of steel or stainless steel. Soldering is slow and cumbersome and is, additionally, complicated when dissimilar metals such as aluminum and steel are involved. Welding aluminum to steel, while offering the possibility of faster production, introduces a number of fabrication problems.

The problems presented by welding aluminum to steel result from their dissimilar characteristics, such as melting point, thermal conductivity, and mechanical character. Additional problems are also presented by either oxidized metal layers or the creation of intermetallic compounds at the joint. The intermetallic compounds and oxidized layers result in a poor or brittle joint of low mechanical strength.

The problems in continuously welding a helically wound aluminum fin on a steel or stainless steel tube for use as a heat exchanger are still further complicated by the requirement that the fin be relatively thin. For example, in the heat exchanger art the practical thickness of the radial portion of an aluminum fin should be between .015″ and .03″. The tube, on the other hand, may have a wall or cross-sectional thickness between .08″ and .125″. Since welding requires that the temperature of the tube be raised to a point sufficient to permit bonding, simultaneously maintaining the temperature of the comparatively small aluminum mass below the temperature at which it may sputter, melt or lose form is extremely difficult.

It is, therefore, an object of the present invention to provide a welding method and apparatus for welding aluminum to either steel or stainless steel.

It is another object of the present invention to provide an improved method and improved apparatus for welding a helically wound aluminum fin on a steel or stainless steel tube.

It is another object of the present invention to provide a steel tube having a wall thickness between about .08″ and .125″ with a spirally or helically wound continuously welded aluminum fin having a nominal thickness between about .015″ and .03″.

The present invention preferably employs conventional high-frequency welding apparatus. This apparatus applies a high-frequency resistance welding current to both the aluminum and steel, which are connected in series with each other to the current source. The high-frequency current provides skin heating of the two metals for bringing the juncture of both metals to a high temperature. Maintaining the temperature level in the steel at a value sufficient to enable bonding, while preventing melting or loss of form in the aluminum, is accomplished in large part by continuously moving the aluminum and steel through the current path and past their juncture at a high velocity.

The velocity is at least 200 feet per minute and preferably 310 feet per minute when aluminum of the aforementioned thickness is welded to steel of the described wall thickness. When aluminum of the described thickness is welded to stainless steel, the minimum velocity must be raised to the neighborhood of 338 feet per minute. The high velocity is presumed to move the heated aluminum from the current path and the heating zone at a rate which prevents excessive heat accumulation in the aluminum and facilitates heat dissipation at input power levels sufficient to enable bonding with minimum formation of intermetallic compounds. It will be noted that the described velocities permit successful welds despite unavoidable variations in heating effect and parameters of the materials, which at other velocities result in excessive critical relationships between input power and velocity.

In order to facilitate control over the temperature of the aluminum and steel, the electrodes, through which the welding current is supplied to the aluminum and steel, are spaced to secure the optimum relative lengths of the electrical path in each metal. This in turn permits the heat generated in the aluminum to be controlled relative to the heat generated in the steel in accordance with the $I^2R$ factor of the electrical path in each metal. Incidental to the electrode spacing, improved apparatus is provided for securing the optimum contact pressure against the aluminum.

To bond the metals and to displace the intermetallic compounds and oxidized layers, bonding pressure is applied to the metals adjacent their juncture. This pressure is applied by a squeeze roller preferably parallel to the major cross-sectional dimension of the fin to enable the maximum desired pressure to be applied without distortion or loss of form in the radial portion of the fin.

Other objects and features of this invention will become apparent upon examination of the following specification and claims together with the accompanying drawings, wherein:

FIG. 1 is a perspective view illustrating the essential arrangement of the apparatus for successful edge welding of an aluminum fin in a helix on a steel tube;

FIG. 2 is another view illustrating the apparatus shown in FIG. 1 but taken perpendicular to the longitudinal axis of the tube;

FIG. 3 is a cross-sectional view of the fin and adjacent tube portion illustrating the manner in which the squeeze roller functions to ensure the required thermal and mechanical characteristics of the bond; and FIG. 4 is a view similar to FIG. 3, but illustrating the manner in which the squeeze roller functions to bond an L-shaped fin to the tube.

In FIG. 1 a thin flat fin 10 of aluminum or an aluminum-base alloy is shown welded on a steel tube 12 by means of a pair of electrodes E1 and E2 connected to a conventional source of high-frequency electrical power 13.

The steel tube 12 has a wall thickness between .08" and .125" and may, for example, be of type AISI 1010 or 1018 steel, or one of the other similar low carbon steels. The tube 12 may also be of stainless steel such as type AISI 304.

The fin 10 may, for example, be type AA 1100–H14 or type AA 3003 aluminum alloy. The nominal thickness or cross section of the aluminum fin 10 is preferably between .015" and .03", and it is approximately ¼" to ⅝" high. The fin may be formed with a taper from its nominal or maximum thickness at its edge juncture with tube 12 to about 50% maximum thickness at its opposite edge in order to relieve the stresses resulting from the change in length at the upper portion of the fin as it is wound about the tube 12. The taper is formed by conventional rolls not shown herein.

The fin 10 is supplied in a strip 14 from a suitable coil and helically wound on tube 12 as the tube both rotates and moves longitudinally in the direction of arrow 16. The strip 14 is moved at a minimum velocity of at least 200 feet per minute and preferably at velocities ranging about 310 feet per minute, depending upon the electrical input power applied across electrodes E1 and E2. Fin 10 is formed, therefore, in a series of helical turns 18 extending radially from tube 12 and spaced substantially .1" from each other turn.

As seen in FIGS. 1, 2 and 3, a squeeze roller 20 having a recess 22 in which the strip 14 is engaged applies radial pressure against strip 14. The pressure serves to bond the strip to tube 12 and is applied along the center line 24 of the roller 20 and parallel to the major cross-sectional dimension of the fin at about .1" beyond the initial juncture 26 of the strip 14 and tube 12. This pressure also serves to squeeze the intermetallic compounds and oxidized metals indicated at 28 in FIG. 3 from the immediate area of the bond between fin 10 and tube 12 and brings the plastic unoxidized surfaces of the aluminum and steel into engagement to form the bond without displacing or distorting the suspended, comparatively fragile strip 14. It will be noted that the formation of intermetallic compounds is a function of both temperature and time and that rapid heating and cooling apparently tends to restrict the formation of intermetallic compounds.

The squeeze roller 20 is rotatably mounted between the arms of a yoke 30, although it may also be cantilever mounted. A stud 32 extends from the yoke 30 through a suitable aperture in a support member 34. A coiled spring 36 encircles the stud 32 between the support member 34 and an adjustment nut 38 on the stud 32. The position of nut 38 controls the force applied by the spring 36 to the squeeze roller 20 to the fin 10 and tube 12 and, therefore, the pressure on the fin. The force which is applied by the spring 36 differs for different types of material, material thickness and welding rates and, therefore, must be optimized for each combination. That force both bonds the fin to the tube and displaces the intermetallic compounds and oxidized metals. A stop 40 at the upper end of stud 32 prevents the stud and squeeze roller from being unintentionally disengaged from the support member 34.

When an L-shaped strip such as 42 shown in FIG. 4 is welded to tube 12 in place of a flat strip such as 14, one leg 44 of the strip engages tube 12 and the other leg 46 extends radially from the tube. The squeeze roller indicated at 48 bears against the upper surface of leg 44. The roller surface may be canted by either controlling the angle of the squeeze roller pivot with respect to the plane of leg 44 or by actually tapering the squeeze roller surface. The canted squeeze roller surface creates a tapered deformation across the juncture of the leg 44 and tube 12. A large deformation of about 50% of the stock thickness is created at the end of the leg 44 opposite radial leg 46. This squeezes the intermetallic compounds 50 formed between leg 44 and tube 12 from the immediate juncture area adjacent leg 46 without unduly thinning the fin at the juncture of legs 44 and 46. A good bond is thus secured with improved heat conductivity and mechanical strength across the major or thicker portion of the leg 44.

It will be understood that in the event a U-shaped fin is welded to tube 12, the intermetallic compounds and oxidized layers are also displaced from the joint through the application of pressure from a squeeze roller in a manner similar to that described.

Since the strip 14 is comparatively fragile and in addition must be both suspended over an extensive length and moved at high speeds, the strip 14 must be adequately guided to ensure that it tracks properly and withstands the necessary pressures. For this purpose a pair of spaced apart guide blocks 52 and 54 of electrically insulating material, such as wood or ceramic, are provided on opposite sides of electrode E1. The guide blocks 52 and 54 are provided with slots 56 and 58, respectively, which correspond to the shape and dimension of strip 14 and through which the strip passes. Block 60 is attached to block 54 to support the strip along the lower edge and sometimes a block similar to 60 is used with block 52. Block 52 is fixed in a desired position with respect to the juncture 26 of strip 14 and tube 12 and extends as close to both the juncture 26 and electrode E1 as possible for the purpose of ensuring that the strip tracks properly. Similarly, block 54 extends as closely as possible to electrode E1. If an L-shaped strip is used, appropriately shaped and dimensioned slots are, of course, provided in the guide blocks. It will also be understood that appropriate rotatable support blocks may be used in place of blocks 52 and 54.

The electrode E1 for the aluminum strip 14 and the electrode E2 for the tube 12 enable a circuit to be completed for the passage of a high-frequency current through the steel and through the aluminum from the power supply 13. The electrodes E1 and E2 are generally formed of one of the following alloy compositions:

57% W, 43% Cu
61% Mo, 39% Ag
99% Cu, 1% alloy such as Cd

The electrodes E1 and E2 are brazed to contact blocks 62 and 64, respectively, and connected to the power supply 13 by heavy conductive bars 66 and 68, respectively. The bars 66 and 68 are generally water cooled in a manner not shown here and are closely spaced for transmission efficiency over the major portion of their length with a thin insulating sheet 70 separating the two bars. The contact blocks 62 and 64 may also be water or oil cooled and bolts, such as 72 and 74, serve to fasten the respective contact blocks 62 and 64 to the corresponding bars 66 and 68 at a desired position with respect to the strip and tube.

The current supplied to electrodes E1 and E2 is derived from a conventional power supply 13 adapted to provide a current of RF frequency ranging up to 450 kc. The actual electrical power applied to the strip 14 and tube 12 is regulated so as to heat the surface of the steel tube 12 to an optimum temperature and the surface of the aluminum strip adjacent the juncture 26 to a desired optimum temperature when moved at one of the previously mentioned speeds.

It will be noted that the electrode E1 is spaced farther from the center line 24 of roller 20 than the electrode E2. Electrode E1 is spaced generally at 3⅛" from center line 24 and electrode E2 is spaced at 1⅝" with this dimension measured along the periphery of tube 12 from the center line 24 to the closest portion of electrode E2. Although wide variations from the described spacing are possible, the differential spacing aids considerably in securing desired different heating effects in the aluminum and steel, respectively, adjacent juncture 26.

The tendency of the high-frequency current to take the lowest impedance path between the two electrodes E1 and E2, of course, enables the heat to be concentrated along this path with the resistance adjacent the juncture of the strip and tube causing the formation of the greatest heat in this area. By spacing the electrodes as described with respect to the center line 24 and moving the strip at one of the mentioned speeds, thermal conditions and heat dissipation are controlled to provide the desired respective degree of heat in the aluminum and steel with minimum coverage over variations in other parameters. A current of sufficient density is, therefore, applied to the steel tube 12 for rendering its surface plastic, and the skin effect of the high-frequency current controls the thermal effect through the aluminum strip 14 so that only the lower surface of strip 14 is rendered plastic. Both surfaces are, therefore, rendered plastic to a desired depth adjacent juncture 26 without excessive deterioration of the aluminum.

As mentioned, the strip 14 is comparatively fragile. The suspension thereof extending to the tube 12 is subject to both distortion and displacement. In order to provide sufficient uniform contact pressure between the fixed electrode E1 and the strip 14 and to eliminate precise machining of the electrode, it is preferable to secure this pressure by pressing the strip 14 against the fixed electrode E1. An electrically insulating pressure pad 76 of wood or ceramic, for example, is therefore located against the surface of strip 14 opposite the electrode E1.

The pad 76 has a leg 78 pivoted on a pin 80. Pin 80 is carried on a support member 82 and passes through a slot 84 in leg 66. This permits longitudinal and angular adjustment of pad 76 relative to the electrode E1. Spring pressure serves to prevent longitudinal displacement of leg 78 and pad 76 with respect to pin 80 when in the desired position relative to the electrode E1.

A stud 86 is carried at the end of leg 78 opposite pad 76. The stud 86 passes through a slot in support 82 and a spring 88 is located between support 82 and an adjustment nut 90 on stud 86. The spring 88 biases the leg 78 and pad 76 for rotation about pin 80 to bring the pad 76 into engagement with the strip 14 and holds the strip engaged with electrode E1 under a force of, for example, 3 to 10 pounds. It will be appreciated, of course, that electrode E1 and pad 76 may also engage the upper and lower edges of strip 14 instead of the sides, as shown.

In operation the tube 12 is moved longitudinally along its axis in the direction of arrow 16 and rotated at a rate which winds the strip 14 at a velocity of at least 200 feet per minute and, as mentioned, preferably at 310 feet per minute in the event tube 12 is of steel. In the event tube 12 is of stainless steel, a minimum speed of 338 feet per minute is preferred. The high-frequency current is applied across electrodes E1 and E2 at substantially 450 kc. and at a power level sufficient to heat the steel and aluminum surfaces to an optimum temperature adjacent the juncture 26. The pressure of spring 36 on the squeeze roller 20 is adjusted, of course, so that the aluminum strip is pressed to the steel with sufficient pressure to bring the parts into intimate contact for welding, while displacing the oxides normally present on the surface of the metals and the intermetallic compounds that are formed between the metals without distorting strip 14. This permits the unoxidized plastic surface of the strip 14 and adjacent unoxidized surface of the steel to form a joint of desired mechanical and thermal character.

The foregoing is a description of a method and apparatus for successfully welding an aluminum strip to a steel or stainless steel of substantially greater mass with the inventive concepts of said method and apparatus being set forth in the apending claims.

What is claimed is:

1. A process comprising the steps of helically winding a thin aluminum strip on a stainless steel tube at a rate greater than about 300 feet per minute, locating one electrode on said aluminum strip at a position prior to the initial juncture of said strip and tube, locating another electrode on said tube prior to the initial juncture of said tube and strip with said other electrode closer to said juncture than said one electrode, and supplying a high-frequency welding current to said electrodes for passage through said tube and strip at a power level sufficient to render the surface of said tube and said strip plastic adjacent said juncture and applying pressure against said strip at a position just past juncture and parallel to the major cross-sectional dimension of said strip and radially inward of said tube.

2. A process comprising the steps of helically winding a thin flat aluminum strip between .015″ and .03″ in thickness on a stainless steel tube having a wall thickness between .08″ and .125″ at a rate of about 310 feet per minute or greater with the major cross-sectional dimension of said strip projecting radially from the surface of said tube, locating one electrode on said aluminum strip at a position prior to the initial juncture of said strip and tube, locating another electrode on said tube prior to the initial juncture of said tube and strip with said other electrode at least .1″ closer to said juncture than said one electrode, and supplying a high-frequency welding current to said electrodes for passage through said tube and strip at a power level sufficient to render only the surface of said tube and said strip plastic adjacent said juncture.

3. A process for continuously welding one leg of a thin flat aluminum strip between .015″ and .03″ in thickness on a stainless steel tube having a wall thickness between .08″ and .125″ with said strip extending perpendicularly to the axis of said tube, the improvement comprising winding said strip upon said tube at the rate greater than 200 feet per minute, locating a squeeze roller with the center line of said roller approximately .1″ beyond the initial juncture of said tube and strip for deforming said strip adjacent said juncture, locating an electrode on said aluminum strip spaced substantially 3.125″ from the center line of said squeeze roller and prior to said juncture of said strip and tube, locating an electrode on said tube spaced substantially 1.625″ from the center line of said squeeze roller as measured along the periphery of said tube and prior to said juncture, and supplying a high-frequency welding current of substantially 450 kc. to said electrodes for passage through said tube and strip at a power level sufficient to form a heat zone in the surface of said tube to one depth and a heat zone in the surface of said strip to another depth adjacent said juncture.

4. An arrangement for high-frequency continuous resistance welding of a thin aluminum strip having a nominal cross-sectional thickness between .015″ to .03″ and height between ¼″ to ⅝″ in a helix to a stainless steel tube having a wall thickness between .08″ and .125″ at a rate greater than 200 feet per minute, the improvement comprising means for placing said strip under pressure in a direction parallel to the major cross-sectional dimension of said strip against said tube adjacent the initial juncture of said strip and tube for displacing intermetallic compound sand oxidized surfaces formed on plasticize surfaces of said tube and strip and tube, an electrode spaced a predetermined minimum distance from said means and engaging said strip at a surface position prior to the juncture of said strip and tube, another electrode spaced from said means substantially less than said predetermined minimum distance and engaging said tube at a surface position prior to the juncture of said strip and tube whereby the surface of said tube is rendered plastic to a desired depth adjacent said juncture and the surface of said strip adjacent said tube surface is rendered plastic to a greater depth adjacent said juncture on the application of high-frequency current to said electrodes.

5. An arrangement for continuously welding a thin aluminum strip having a nominal thickness between .015" and .03" in a helix to a stainless steel tube having a wall thickness between .08" and .125", the improvement comprising a squeeze roller located adjacent the initial juncture of said tube and strip and adapted to engage one surface of said strip under sufficient pressure against said tube to displace intermetallic compounds and oxidized surfaces on said strip and tube adjacent said juncture when the adjacent surfaces of said strip and tube are rendered plastic, an electrode spaced substantially 3⅛" from the center line of said squeeze roller for engaging said aluminum strip prior to said juncture, and an electrode spaced substantially 1⅝" from the center line of said squeeze roller as measured along the periphery of said tube for engaging said tube prior to said juncture, whereby a high-frequency welding current supplied to said electrodes for passage through said tube and strip adjacent said juncture renders the surface of said tube and said strip plastic adjacent said juncture.

References Cited
UNITED STATES PATENTS

| | | | |
|---|---|---|---|
| 2,763,470 | 9/1956 | Certain | 165—184 XR |
| 2,965,744 | 12/1960 | Busse | 219—107 |
| 3,047,712 | 7/1962 | Morris | 219—107 |

OTHER REFERENCES

Welding Engineer, March 1960, "New Method Simplifies Fin-to-Tube Welding," pp. 42–43.

RICHARD M. WOOD, *Primary Examiner.*

C. CHADD, *Assistant Examiner.*

U.S. Cl. X.R.

219—118

U.S. DEPARTMENT OF COMMERCE

PATENT OFFICE

Washington, D.C. 20231

UNITED STATES PATENT OFFICE
CERTIFICATE OF CORRECTION

Patent No. 3,435,183                                                 March 25, 196

Julius J. Vagi

It is certified that error appears in the above identified patent and that said Letters Patent are hereby corrected as shown below:

Column 6, line 64, "compound sand" should read -- compounds and --; same line 64, "plasticize" should read -- plasticized --; line 65, after "strip" insert -- adjacent said juncture in order to bond said strip --.

Signed and sealed this 7th day of April 1970.

(SEAL)
Attest:

Edward M. Fletcher, Jr.                                WILLIAM E. SCHUYLER, JI

Attesting Officer                                                     Commissioner of Patents